United States Patent
Chiang (10) Patent No.: US 10,924,607 B2
(45) Date of Patent: Feb. 16, 2021

(54) SOFT DROP INDICATOR BASED ON UE TRIGGERS

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/231,204

(22) Filed: Dec. 21, 2018

(65) Prior Publication Data
US 2020/0204676 A1    Jun. 25, 2020

(51) Int. Cl.
| H04M 3/22 | (2006.01) |
| G06Q 30/00 | (2012.01) |
| H04M 1/82 | (2006.01) |
| H04W 4/16 | (2009.01) |

(52) U.S. Cl.
CPC .......... *H04M 3/2281* (2013.01); *G06Q 30/01* (2013.01); *H04M 1/82* (2013.01); *H04M 3/2227* (2013.01); *H04W 4/16* (2013.01); *H04M 2203/2038* (2013.01)

(58) Field of Classification Search
USPC ...................................................... 455/404.1
See application file for complete search history.

(56) References Cited

U.S. PATENT DOCUMENTS

| 7,009,962 | B1* | 3/2006 | Chung | H04M 3/54 370/356 |
| 9,277,049 | B1* | 3/2016 | Danis | H04M 3/54 |
| 2002/0045468 | A1* | 4/2002 | Jalili | H04M 1/72519 455/567 |
| 2007/0294415 | A1* | 12/2007 | Kelder | H04M 7/0063 709/227 |
| 2009/0111460 | A1* | 4/2009 | Bosch | H04W 4/16 455/423 |
| 2012/0281589 | A1* | 11/2012 | Ozawa | H04L 43/0829 370/252 |
| 2015/0163709 | A1* | 6/2015 | Lee | H04L 65/1016 370/332 |
| 2015/0245184 | A1* | 8/2015 | Govande | H04W 4/16 455/417 |
| 2017/0237783 | A1* | 8/2017 | Yang | H04W 36/08 370/331 |
| 2017/0279963 | A1* | 9/2017 | Mittal | H04M 15/8221 |

* cited by examiner

*Primary Examiner* — Maria El-Zoobi
(74) *Attorney, Agent, or Firm* — Lee & Hayes, P.C.

(57) ABSTRACT

A user equipment (UE) that is attempting to place a call, or is engaged in an active call, can monitor for the occurrence of soft drop conditions that may reflect a bad user experience. Upon such a soft drop condition, the UE can activate soft drop trigger. If a user provides input to manually terminate the call while the soft drop trigger is active, the UE can consider the manual call termination to be a "soft drop" due the bad user experience. The UE can provide a notification to a telecommunication network indicating that the manual call termination is a soft drop due to a particular soft drop condition, such that the telecommunication network can investigate and/or remedy causes of the soft drop.

18 Claims, 7 Drawing Sheets

| Protocol Value 304 | Cause Value 306 | Reason-text 308 |
|---|---|---|
| RELEASE_CAUSE | 1 | User ends call |
| RELEASE_CAUSE | 2 | User ends call RTP/RTCP time-out |
| RELEASE_CAUSE | 3 | User ends call Media bearer loss |
| RELEASE_CAUSE | 4 | User ends call SIP response time-out |
| RELEASE_CAUSE | 5 | User ends call SIP response time-out |
| FAILURE_CAUSE | 1 | User ends call Media bearer or QoS lost |
| FAILURE_CAUSE | 2 | User ends call SIP release of signaling bearer |
| FAILURE_CAUSE | 3 | User ends call Indication of failed resources allocation |

SOFT DROP INDICATOR BASED ON UE TRIGGERS

BACKGROUND

Users have come to rely on being able to make and receive calls wirelessly over telecommunication networks using mobile phones and other user equipment (UE). Unfortunately, some call issues can lead to bad user experiences. For example, in some instances an attempted call cannot be connected due to problems with a telecommunication network or a UE. In other instances, audio can drop during an active call such that one or more call participants cannot hear what another call participant is saying.

Users can always provide user input to manually end an active call or terminate a call attempt that has not yet been connected. In some situations, a user may manually end a call when a conversation reaches a natural end point, or when a user dials a number but then decides to hang up while the call is still ringing. However, in other situations, a user may manually end a call in frustration when a technical issue causes a bad user experience. A call that is ended manually by a user due to a bad user experience, when the user might not have otherwise ended the call, can be referred to as a "soft drop."

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

User equipment (UE) can connect to a telecommunication network to make or receive calls, transmit or receive messages and/or other data, and/or perform any other network operation. For example, a UE can be a mobile phone that connects to a telecommunication network to make a call, such as a voice call or video call.

Unfortunately, technical issues with the UE or the telecommunication network can occasionally lead to a bad user experience either during setup of a call or during an active call. For example, when an originating UE attempts to place a call to a terminating UE, network issues may prevent the call from being connected to the terminating UE. As another example, after a call has been connected between two UEs and a call session has been established, technical issues may cause the transmission of audio data between the UEs to fail in either or both directions. A call participant can perceive this audio drop as a "mute call" and become frustrated when the other call participant cannot hear what they are saying.

Conventionally, some UEs are configured to take automatic actions when the UE detects conditions that may lead to a bad user experience. For example, some UEs are configured to automatically end a call when an audio drop is detected. As another example, when a call fails on a packet-switched network, some UEs are configured to automatically attempt circuit-switched fallback procedures to retry the call on a legacy circuit-switched network.

However, when UEs take such automatic actions in response to detected conditions associated with bad user experiences, they may not report to a telecommunication network that such conditions were experienced or were the cause of its automatic actions. Accordingly, the telecommunication network may remain unaware of conditions causing bad user experiences, and not take remedial action to correct such conditions and prevent similar bad user experiences for other UEs in the future.

Additionally, a UE's automatic actions may not necessarily be what the telecommunication network or a user would want. For example, a UE configured to automatically attempt a circuit-switched fallback may not be able to do so if legacy circuit-switched networks have been decommissioned, such as if 5G and LTE networks are available but a legacy circuit-switched 3G network is no longer available. As another example, a user who has placed a 911 call or other emergency call may not want his or her UE to automatically end the emergency call due to a bad user experience. For instance, if a UE automatically ends an active emergency call due to an audio drop, a user may need to place a second emergency call and explain his or her emergency again to a new 911 operator. The user may instead prefer that the call be kept active despite the audio drop, so that if and when the audio returns, the user can continue his or her conversation with the same 911 operator.

A user may always have the option to press an "end" button in a user interface of a UE or otherwise manually end an attempted or active call. In some examples, a user may manually end a call based on the user's own choice unrelated to a bad user experience, such as when a user ends a call because a conversation has reached its natural end or when a user dials a phone number but then chooses to hang up while the call is ringing and before it is answered. A user may also hang up a call accidentally, not in response to a bad user experience.

However, when technical issues cause a bad user experience as described above, a user may choose to manually end an attempted or active call due to the bad user experience, even if the user would otherwise have wanted to continue the call. Such a situation in which a user manually ends a call due to a bad user experience, when the user otherwise would not have ended the call, can be referred to as a "soft drop."

For example, a soft drop may occur if an attempted call is taking a long time to connect, and a user becomes frustrated and hangs up, possibly to try again another time.

As another example, a soft drop can occur if audio drops during an active call and a user hangs up in order to retry the call. To continue the above example related to audio drops during an emergency call, although a UE may be configured to not drop the emergency call automatically upon an audio drop, a user can have the option of manually terminating the emergency call and retrying it if he or she desires. Such a manual termination of an emergency call due to an audio drop can be considered a soft drop.

It can be useful for an operator of a telecommunication network to know when a terminated call setup or active call is a "soft drop" manually initiated by a user due to a bad user experience, and is not one that the user manually ended at their own discretion or due to a mistake unrelated to a bad user experience. For example, information indicating that soft drops occur more frequently in association with particular network nodes, particular network locations, particular UE models, particular groups of subscribers, particular times of day, and/or any other particular attributes of UEs or the telecommunication network, an operator of the telecommunication network may be able to investigate the cause of the soft drops and/or bad user experiences and prevent similar soft drops in the future. This can be especially useful in the rollout of new generations of telecommunication networks, as a network operator could quickly be informed about problem areas in the new network generation that are leading to soft drops, and address such problems to make the rollout smoother for other users.

However, while diagnostic information about soft drops can be useful to a telecommunication network, UEs conventionally do not provide information to telecommunication networks indicating that manually ended calls are soft drops.

Described herein are systems and methods by which a UE can determine that a manual call termination is a soft drop, and report a soft drop indicator to a telecommunication network. The UE can activate a soft drop trigger upon the occurrence of conditions associated with a bad user experience that are considered likely to lead to a soft drop, and also activate a manual end trigger upon receipt of manual user input instructing the UE to end call setup or an active call. The combination of an active soft drop trigger and an active manual end trigger can cause the UE to send a message to the telecommunication network that identifies the manual call termination as a soft drop and/or a likely reason for the soft drop.

Example Environments

Figure 1:
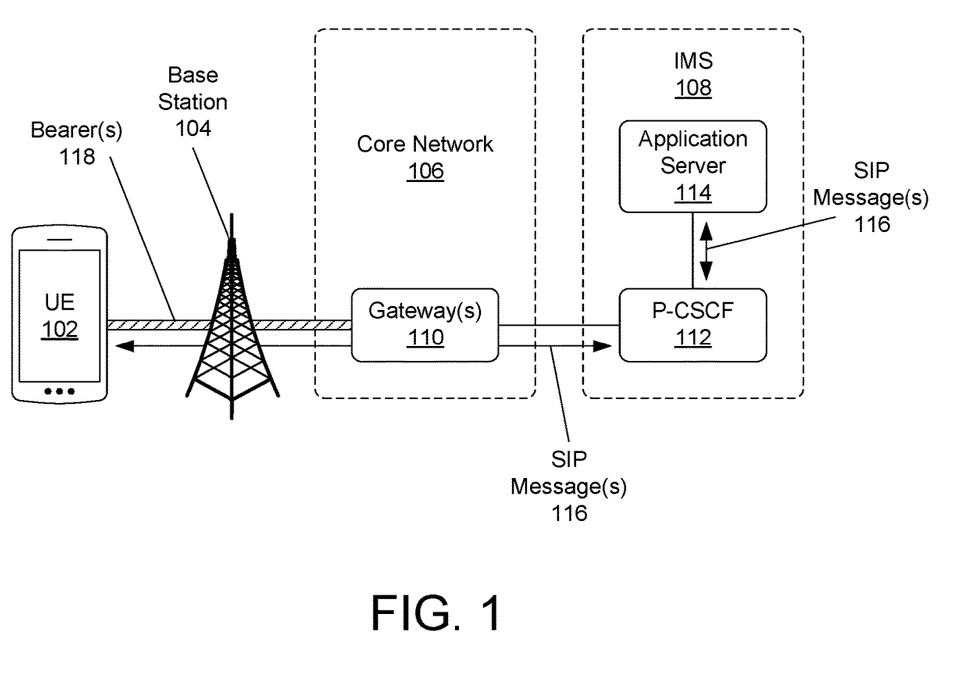
FIG. 1 depicts an example environment in which user equipment (UE) can connect to a telecommunication network.

FIG. 1 depicts an example environment in which user equipment (UE) 102 can connect to a telecommunication network to make or receive calls, transmit or receive messages and/or other data, and/or perform any other network operation. A UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. Example architecture for a UE 102 is illustrated in greater detail in FIG. 5 and is described in detail below with reference to that figure.

The telecommunication network can have one or more base stations 104, a core network 106, and an Internet Protocol (IP) Multimedia Subsystem (IMS) 108. Elements of the telecommunication network can be based on one or more wireless access technologies and/or provide network access to UEs 102 through one or more wireless access technologies. For example, wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology.

A base station 104 can be a node or other access point that provides a connected UE 102 with access to the core network 106 through a wireless access technology. For example, a base station 104 can be a Node B (NB), eNode B (eNB), gNB, Wi-Fi access point, or any other type of base station or access point.

The core network 106 can have various network nodes for connecting and managing UEs 102, including gateways 110 that can receive, process, and/or forward data packets from other network elements. For example, the gateways 110 can include Serving Gateways (S-GWs) that link the core network 106 to UEs 102 via base stations 104 and Packet Data Network (PDN) Gateways (P-GWs) that link the core network 106 to the IMS 108.

The IMS 108 can include network nodes that set up and manage communication sessions for UEs 102. For example, the IMS 108 can have Proxy Call Session Control Functions (P-CSCFs) 112 that are linked to the core network 106 and serve as entry points to the IMS 108 for UEs 102. P-CSCFs 112 can be linked, via Serving CSCFs (S-CSCFs) and/or other elements, to Application Servers 114 that provide services for certain types of communication sessions. For example, an Application Server 114 of an IMS 108 can set up and manage a communication session for a voice call.

Elements of the IMS 108 can route and/or process Session Initiation Protocol (SIP) messages 116, and/or exchange SIP messages 116 with UEs 102, to set up, manage, and terminate communication sessions. For example, when a user of a UE 102 wants to make a voice call, the UE 102 can send a SIP INVITE message through the core network 106 to a P-CSCF 112 of the IMS 108. The SIP INVITE message can be routed through the IMS 108 to an Application Server 114 that manages voice calls, which can assist in setting up network resources for a communication session for the call. In some examples, after a UE 102 sends a SIP INVITE to initiate a call with a terminating UE 102, but before the terminating UE 102 answers the call, the UE 102 can send a SIP CANCEL message to the IMS 108 to indicate that the call should not be connected. In other examples, after a call has been connected, UE 102 can end the active call by sending a SIP BYE message to the IMS 108 that results in termination of the call.

After a communication session for a call has been set up using SIP messages 116 as described above, media data for the active call can be transferred between UEs 102 using Real-time Transport Protocol (RTP) packets. Control data and information about the call can also be transferred between UEs 102 using RTP Control Protocol (RTCP) packets. For example, RTCP packets can convey Quality of Service (QoS) information about the call.

A telecommunication network can manage different types traffic for the same UE 102 by setting up different bearers 118 between the UE 102, base stations 104, gateways 110, and/or other elements of the telecommunication network. For example, when a UE 102 connects to the telecommunication network, the telecommunication network can set up a default bearer 118 for general Internet data and another default bearer 118 for SIP messages 116 going to and from the IMS 108. The telecommunication network may also set up one or more dedicated bearers 118 that may be associated with specific communication sessions and/or specific types of traffic. For example, a dedicated bearer 118 can be set up to carry a voice call's audio data.

In some examples, different bearers 118 can be associated with different QoS Class Identifier (QCI) values or 5G QoS Indicator (5QI) values that indicate desired QoS levels for traffic of those bearers 118. For example, in some cases a default bearer 118 for general Internet data can have a QCI of 6, while a dedicated bearer 118 for a call's audio data can have a QCI of 1. Due to the dedicated bearer's QCI of 1, gateways 110 and other network elements can be configured to prioritize the voice call audio data on the dedicated bearer 118 over general Internet data on the default bearer 118. Accordingly, during network congestion, delivering audio data on the dedicated bearer 118 for the voice call can be prioritized even if other general Internet data on the default bearer 118 is delayed.

Figure 2A:
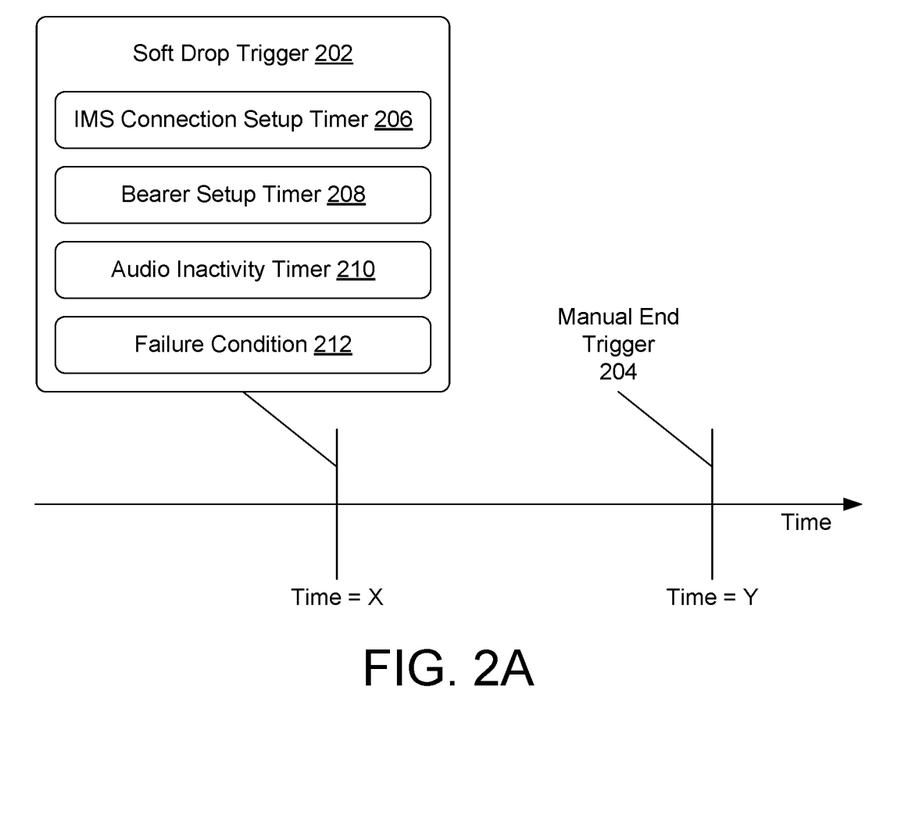
FIGS. 2A and 2B depict example timelines in which a UE can activate a soft drop trigger and/or a manual end trigger.
Figure 2B:
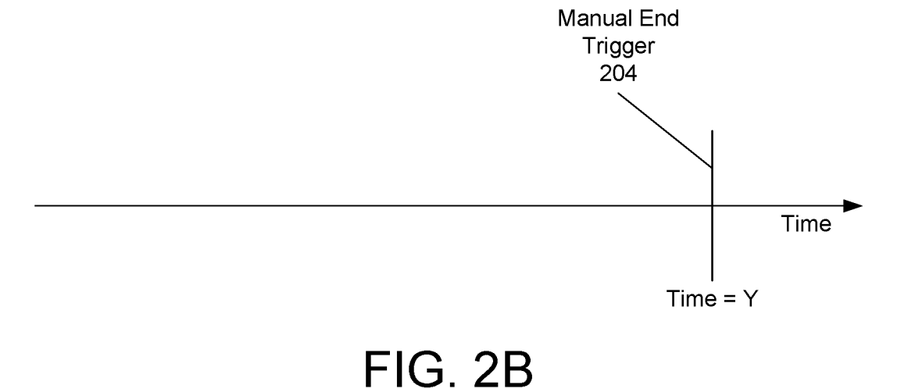

FIGS. 2A and 2B depict example timelines in which a UE 102 can activate a soft drop trigger 202 and/or a manual end trigger 204. As described further below, a soft drop trigger 202 can be activated at a UE 102 upon the occurrence of one or more events that are considered likely to indicate a bad user experience. A manual end trigger 204 can be activated at a UE 102 upon receipt of user input that instructs the UE 102 to end a call, either during call setup before the call is active or while the call is active. For example, a manual end trigger 204 can be activated when a user presses a hardware or virtual "end" button on a UE 102 as an instruction to hang up an active call or to cancel setup of an attempted call before another UE 102 answers the call.

The UE 102 can maintain a database, table, or other local data indicating whether a soft drop trigger 202 and/or a manual end trigger 204 have been activated with respect to a particular active or attempted call. When a soft drop trigger 202 has been activated, the UE 102 can also maintain data about a soft drop condition that activated the soft drop trigger 202, as will be discussed below.

As shown in FIG. 2A, a soft drop trigger 202 can be activated upon the occurrence of various soft drop conditions, including expiration of an IMS connection setup timer 206, expiration of a bearer setup timer 208, expiration of an audio inactivity timer 210, or upon the occurrence of a failure condition 212.

An IMS connection setup timer 206 can be associated with an amount of time it takes for an IMS node to respond to a SIP INVITE message sent by the UE 102. For example, when the UE 102 wants to initiate a call, the UE 102 can send a SIP INVITE message towards a first P-CSCF 112 of the IMS 108. When the UE 102 sends the SIP INVITE message, the UE 102 can start an IMS connection setup timer 206 that is initially set for predetermined timer period, such as 5 seconds, 8 seconds, 10 seconds, or any other period of time. If the first P-CSCF 112 responds to the UE 102 before the IMS connection setup timer 206 expires, such as by returning a SIP message 116 with a "100 Trying" response code to the UE 102, the UE 102 can stop the IMS connection setup timer 206 such that a soft drop trigger 202 is not activated.

However, if an IMS connection setup timer 206 expires before the first P-CSCF 112 responds to the UE 102, the expiration of the IMS connection setup timer 206 can activate a soft drop trigger 202. For example, when the IMS connection setup timer 206 was set for 8 seconds, but the first P-CSCF 112 is offline or is experiencing issues that prevent it from responding within 8 seconds of the UE's transmission of the SIP INVITE message, a soft drop trigger 202 can be activated at the UE 102.

A bearer setup timer 208 can be associated with an amount of time it takes for a dedicated bearer 118 for a call to be set up. A dedicated bearer 118 can be specific for one or more particular media types and/or data flows related to a call. For example, when a UE 102 sends a SIP INVITE message to initiate a voice call, an Application Server 114 or other element of the IMS 108 can request that the core network 106 set up a dedicated bearer 118 with the UE 102 for the voice call's audio data. Similarly, for a video call a dedicated bearer 118 can be set up for both video and audio data, or separate dedicated bearers 118 can be set up for the video and audio data.

When a UE 102 sends a SIP INVITE message to initiate a call, the UE 102 can accordingly start a bearer setup timer 208 that is initially set for predetermined timer period, such as 5 seconds, 8 seconds, 10 seconds, or any other period of time. If the UE 102 receives notice from the telecommunication network about setup of a dedicated bearer 118 for the call before the bearer setup timer 208 expires, the UE 102 can stop the bearer setup timer 208 such that a soft drop trigger 202 is not activated. In some examples, if multiple dedicated bearers 118 are expected to be associated with an attempted call, the UE 102 can have separate bearer setup timers 208 for each type of bearer 118, or not stop a single bearer setup timer 208 until all expected dedicated bearers 118 have been set up.

However, if a bearer setup timer 208 expires before the UE 102 receives notice about setup of the dedicated bearer 118, the expiration of the bearer setup timer 208 can activate a soft drop trigger 202. For example, when the bearer setup timer 208 was set for 10 seconds, and the UE 102 does not receive notice about setup of a dedicated bearer 118 for the call within 10 seconds of the UE's transmission of the SIP INVITE message, a soft drop trigger 202 can be activated at the UE 102.

An audio inactivity timer 210 can be associated with an amount of time during which no audio data is being sent or received by a UE 102 during an active call. In other words, the audio inactivity timer 210 can run during periods which a user of the UE 102 may be experiencing an undesirable audio drop during an active call.

After a call has been set up between UEs 102, audio data can be transferred between the UEs 102 in RTP packets. RTCP packets can also be used by the UEs 102 during the active call to exchange control information, such as QoS information. When an active call begins in response to a call setup completion message, the UE 102 can start an audio inactivity timer 210 that is initially set for predetermined timer period, such as 10 seconds, 15 seconds, 30 seconds, or any other period of time. The UE 102 can monitor for RTP and/or RTCP packets both in uplink and downlink directions. The UE 102 can detect audio activity during the active call when RTP and/or RTCP packets are found in uplink and downlink communications. Whenever the UE 102 detects such audio activity due to RTP and/or RTCP packets, the UE 102 can reset the audio inactivity timer 210 back to the original predetermined timer period. However, when no RTP or RTCP packets are found in uplink or downlink communications such that no audio activity is detected, the audio inactivity timer 210 can run.

If the audio inactivity timer 210 expires, the expiration of the audio inactivity timer 210 can activate a soft drop trigger 202. For example, when the audio inactivity timer 210 was set for 30 seconds, and during a 30 second period the UE 102 did not detect any RTP or RTCP packets in uplink or downlink communications that would have reset the audio inactivity timer 210 back to 30 seconds, the audio inactivity timer 210 can expire and activate a soft drop trigger 202.

Other failure conditions 212 that can activate a soft drop trigger 202 can include an indication that an existing dedicated bearer 118 is being released by the telecommunication network, an indication that an existing bearer 118 for IMS signaling is being released by the telecommunication network, or an indication that the UE is unable to allocate resources for a call. For example, a soft drop trigger 202 can be activated if the telecommunication network informs a UE 102 during an active call that a dedicated bearer 118 for the call is being released, or if the telecommunication network informs a UE 102 that a default bearer 118 or other bearer 118 that had been set up to carry SIP messages 116 between the UE 102 and the IMS 108 is being released. As another example, a soft drop trigger 202 can be activated if the UE 102 experiences issues that prevent it from allocating enough computing resources for a call.

Although a soft drop trigger 202 can be activated based on the occurrence of any of multiple soft drop conditions as described above, the UE 102 can be configured to not automatically end call setup or an active call based on the activation of a soft drop trigger 202. Instead, the UE 102 can be configured to wait for a later manual end trigger 204. FIG. 2A depicts a situation in which a soft drop trigger 202 is activated at time X, but call setup or an active call continues until a manual end call trigger 204 is activated at later time Y.

For example, if a soft drop trigger 202 is activated at time X due to expiration of an IMS connection setup timer 206 when no response to a SIP INVITE message is received from a first P-CSCF 112, a UE 102 may continue attempting to set up the call by sending additional SIP INVITE messages to one or more other P-CSCFs 112 if no manual end trigger 102 has yet been activated. The soft drop trigger 202 can remain activated during these additional call setup attempts, such that it is active when a later manual end trigger 204 is activated.

As another example, when a soft drop trigger 202 is activated due an expiration of a bearer setup timer 208, the UE 102 can be configured to not automatically end the call. Instead, while the soft drop trigger 202 can remain activated, the UE 102 can continue to attempt to establish a dedicated bearer 118 for the call, possibly by re-registering with the IMS 108. Accordingly, despite such attempts to set up the dedicated bearer 118, the soft drop trigger 202 would be active if the user chooses to manually end the call and activates the manual end trigger 204.

As yet another example, when a soft drop trigger 202 is activated due an expiration of an audio activity timer 210, the UE 102 can be configured to not automatically end an active call, such that a user can wait for audio activity to return or manually end the call and activate a manual end trigger 204. For example, a user may prefer to wait to see if the audio activity returns rather than ending the call, or instead may choose to manually end the call themselves. This can be especially useful when an active call is an emergency call that the user would prefer not to start over with a new emergency operator.

The UE 102 can be configured to not automatically attempt a circuit-switched fallback procedure in which a call that failed on a packet-switched network such as an LTE network is tried again on a legacy circuit-switched network such as a 3G network. For example, circuit-switched fallback may not available in some situations, such as when a telecommunication network includes 5G and LTE packet-switched networks but has discontinued legacy circuit-switched networks. Instead, the UE 102 can continue attempting a call on the packet-switched network until manual end call trigger 204 is activated.

If a manual end trigger 204 is activated while a soft drop trigger 202 is also active, the combination of an active manual end trigger 204 and an active soft drop trigger 202 can signify that a manual call termination is a soft drop. For example, a user may have experienced a bad user experience due to the soft drop conditions that activated the soft drop trigger 202, and reacted to the bad user experience by pressing an "end" button to manually end an attempted or active call. This situation is shown in FIG. 2A. However, in some examples a manual end trigger 204 may be activated while a soft drop trigger 202 is not also active, as shown in FIG. 2B. In this situation, the manual end trigger 204 may indicate that the user manually ended the call on purpose or by mistake, unrelated to a bad user experience, such that the manual call termination should not be considered a soft drop.

In some situations, a user may choose to not immediately end a call manually upon a bad user experience, and wait to see if the user experience improves. If the user experience does improve, a later activation of a manual end trigger 204 may be unrelated to the earlier bad user experience. For example, if a soft drop trigger 202 is activated due to delay in call setup, but a user waits out the delay until the call is eventually connected, the user may be happy once the call is eventually connected. A later activation of a manual end trigger 204 may not be related to the initial call setup delay, but instead be due to a natural end of a conversation. As another example, if a soft drop trigger 202 is activated due to an audio drop during an active call, but the user does not hang up and waits until audio activity returns, the user may be happy to continue the call normally. A later activation of a manual end trigger 204 may not be related to an audio drop, but instead be due to a natural end of a conversation.

Accordingly, in some examples a previously-activated soft drop trigger 202 can be deactivated if the soft drop conditions that led to activation of the soft drop trigger 202 are resolved such that those conditions are not likely to be the cause of a later activation of a manual end trigger 204. In some examples, activation of a soft drop trigger 202 can persist for at least a predetermined period of time before deactivation is permitted, such that even if conditions associated with the soft drop trigger 202 are resolved but a user manually ends a call within that predetermined period of time, the cause of the manual call termination can be considered to be the cause of the soft drop trigger's activation. For example, if a soft drop trigger 202 is activated due to a detected audio drop during an active call, and a user manually terminates the call within a 10 second preset period despite the return of audio activity, the reason for the manual call termination can be interpreted to be the audio drop.

Figure 3:
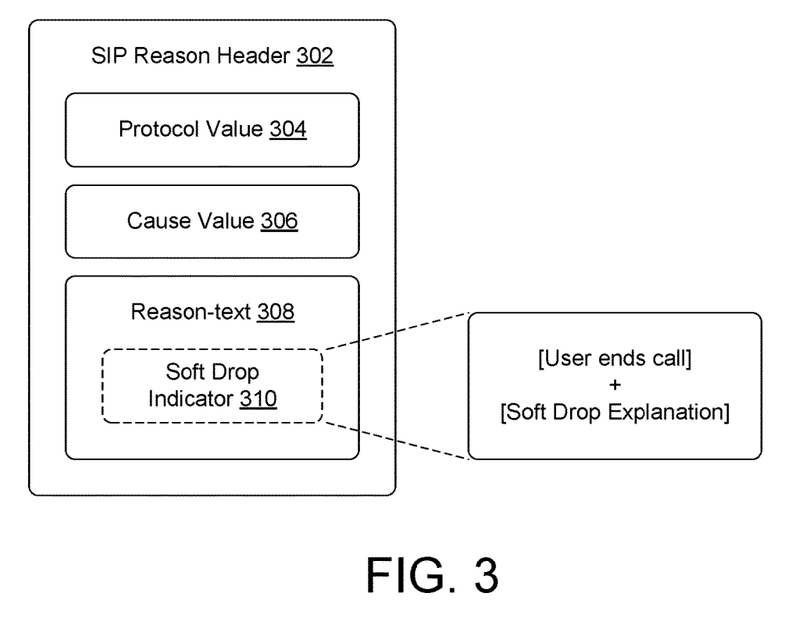
FIG. 3 depicts a SIP reason header that can be included in a SIP message sent by a UE upon activation of a manual end trigger.

FIG. 3 depicts a SIP reason header 302 that can be included in a SIP message 116 sent by the UE 102 to the telecommunication network upon activation of a manual end trigger 204. For example, when a user manually terminates a call setup attempt, the SIP reason header 302 can be included in a SIP CANCEL message sent to the IMS 108. As another example, when a user manually terminates an active call, the SIP reason header 302 can be included in a SIP BYE message sent to the IMS 108.

Figure 4:
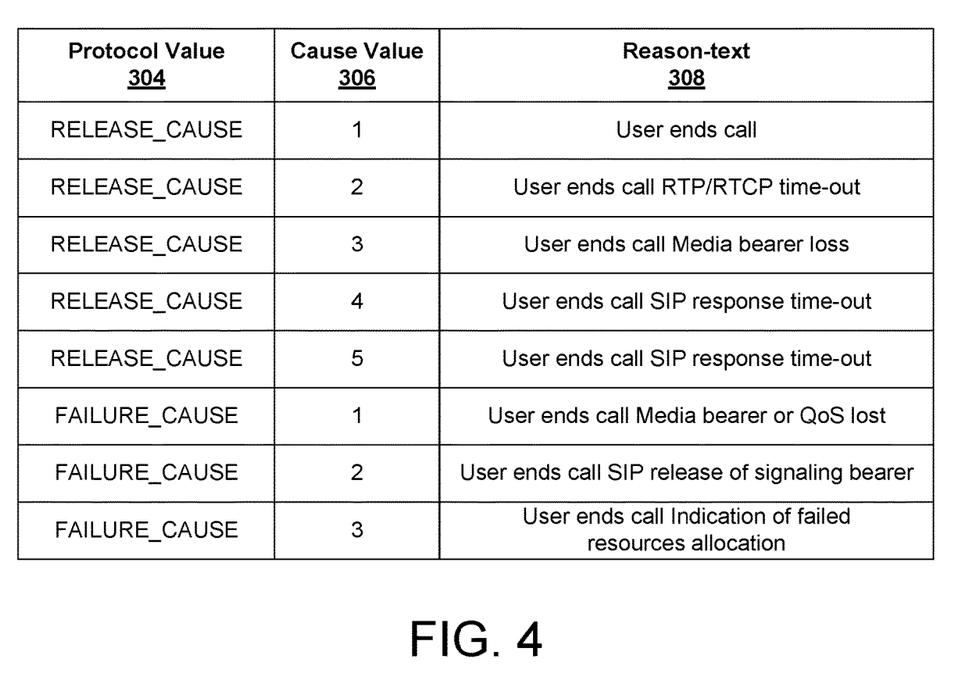
FIG. 4 depicts a chart of example SIP reason headers with various combinations of protocol values, cause values, and reason-text.

The SIP reason header 302 can include a protocol value 304, a cause value 306, and reason-text 308. If a call termination should be considered as soft drop, the reason-text 308 can include a soft drop indicator 310 as discussed below. FIG. 4 depicts a chart of example SIP reason headers 302 with various combinations of protocol values 304, cause values 306, and reason-text 308.

The protocol value 304 can identify a protocol used to interpret the cause value 306. In some examples, a protocol value 304 can be a text string such as "RELEASE_CAUSE" or "FAILURE_CAUSE." A cause value 306 can be an integer value associated with a call termination reason. However, the same cause value 306 can be interpreted differently if it is used with different protocol values 304. For example, a SIP Reason Header 302 with a protocol value 304 of "RELEASE_CAUSE" with a cause value 306 of "1" can indicate a different call termination reason than another SIP Reason Header 302 with a protocol value 304 of "FAILURE_CAUSE" with a cause value 306 of "1," even though both have the same cause value 306.

Although a combination of a SIP reason header's protocol value 304 and its cause value 306 can provide some information as to why a UE 102 is terminating a call setup or an active call, the protocol value 304 and the cause value 306 may not be enough to indicate whether the call termination should be considered a soft drop. For example, the protocol value 304 and the cause value 306 may not directly indicate whether the UE 102 is ending the call automatically on its own, due to an instruction by the network or by another party to the call, due to a user choice or mistake unrelated to a bad user experience, or due to user choice related to a bad user experience.

A SIP reason header's reason-text 308 can include a text string with more information about why a call setup or active call is being terminated. Although standards can define some text strings for the reason-text 308 field that are associated with particular combinations of the protocol value 304 and the cause value 306, such standard reason-text 308 strings are also not enough to indicate whether a UE's termination of a call should be considered a soft drop.

Accordingly, a SIP reason header's reason-text 308 can include a soft drop indicator 310 if an active soft drop trigger 202 and an active manual end trigger 204 indicate that a manual call termination should be considered a soft drop. The soft drop indicator 310 can include a first text portion, such as "User ends call," that indicates that the UE 102 is ending the call based on a manual user instruction, and is not automatically ending the call for any other reason. The soft drop indicator 310 can also include a second text portion that explains the reason for the soft drop. The second text portion can be related to the reason why the soft drop trigger 202 was activated. In some examples, the second text portion can correspond to a particular cause value 306. If a SIP reason header's reason-text 308 does not include both the first text portion and the second text portion, it can be interpreted that the reason-text 308 does not include a soft drop indicator 310.

As a first example, as shown in FIG. 4, a SIP reason header 302 may have a protocol value 304 of "RELEASE_CAUSE," a cause value 306 of "1," and a reason-text 308 of "User ends call." In this example, the SIP reason header 302 does not include a soft drop indicator 310. The reason-text 308 only includes "User ends call" to indicate that the UE 102 is terminating the call based on a manual user instruction. However, in this example there is no second text portion that explains a reason for a soft drop. Accordingly, the telecommunication network can interpret this SIP reason header 302 to not be indicating a soft drop.

As a second example, as shown in FIG. 4, a SIP reason header 302 may have a protocol value 304 of "RELEASE_CAUSE," a cause value 306 of "2," and a reason-text 308 of "User ends call RTP/RTCP time-out." In this example, the SIP reason header 302 does include a soft drop indicator 310 because the reason-text 308 includes "User ends call" to indicate that the UE 102 is terminating the call based on a manual user instruction, as well as a second text portion of "RTP/RTCP time-out." The second text portion of "RTP/RTCP time-out" can be used in a soft drop indicator 310 when a soft drop trigger 202 was activated due to expiration of an audio inactivity timer 210. Accordingly, the telecommunication network can interpret this SIP reason header 302 to be indicating a soft drop, likely due to an audio drop during an active call.

As a third example, as shown in FIG. 4, a SIP reason header 302 may have a protocol value 304 of "RELEASE_CAUSE," a cause value 306 of "3," and a reason-text 308 of "User ends call Media bearer loss." In this example, the SIP reason header 302 does include a soft drop indicator 310 because the reason-text 308 includes "User ends call" to indicate that the UE 102 is terminating the call based on a manual user instruction, as well as a second text portion of "Media bearer loss." The second text portion of "Media bearer loss" can be used in a soft drop indicator 310 when a soft drop trigger 202 was activated due to expiration of a bearer setup timer 208. Accordingly, the telecommunication network can interpret this SIP reason header 302 to be indicating a soft drop, likely due to a call setup delay related to delays in setting up a media bearer 118 for the call.

As a fourth example, as shown in FIG. 4, a SIP reason header 302 may have a protocol value 304 of "RELEASE_CAUSE," a cause value 306 of "4" or "5," and a reason-text 308 of "User ends call SIP response time-out." In this example, the SIP reason header 302 does include a soft drop indicator 310 because the reason-text 308 includes "User ends call" to indicate that the UE 102 is terminating the call based on a manual user instruction, as well as a second text portion of "SIP response time-out." The second text portion of "SIP response time-out" can be used in a soft drop indicator 310 when a soft drop trigger 202 was activated due to expiration of an IMS connection setup timer 206. Accordingly, the telecommunication network can interpret this SIP reason header 302 to be indicating a soft drop, likely due to a call setup delay caused by an unresponsive node of the IMS 108.

As a fifth example, as shown in FIG. 4, a SIP reason header 302 may have a protocol value 304 of "FAILURE_CAUSE," a cause value 306 of "1," and a reason-text 308 of "User ends call Media bearer or QoS lost." In this example, the SIP reason header 302 does include a soft drop indicator 310 because the reason-text 308 includes "User ends call" to indicate that the UE 102 is terminating the call based on a manual user instruction, as well as a second text portion of "Media bearer or QoS lost." The second text portion of "Media bearer or QoS lost" can be used in a soft drop indicator 310 when a soft drop trigger 202 was activated due to a failure condition 212 in which a previously established media bearer 118 for the call was released by the telecommunication network. Accordingly, the telecommunication network can interpret this SIP reason header 302 to be indicating a soft drop, likely due to a bad user experience related to the network's release of the media bearer 118 for the call.

As a sixth example, as shown in FIG. 4, a SIP reason header 302 may have a protocol value 304 of "FAILURE_CAUSE," a cause value 306 of "2," and a reason-text 308 of "User ends call SIP release of signaling bearer." In this example, the SIP reason header 302 does include a soft drop indicator 310 because the reason-text 308 includes "User ends call" to indicate that the UE 102 is terminating the call based on a manual user instruction, as well as a second text portion of "SIP release of signaling bearer." The second text portion of "SIP release of signaling bearer" can be used in a soft drop indicator 310 when a soft drop trigger 202 was activated due to a failure condition 212 in which a previously established IMS signaling bearer 118 was released by the telecommunication network. Accordingly, the telecommunication network can interpret this SIP reason header 302 to be indicating a soft drop, likely due to a bad user experience related to the network's release of the IMS signaling bearer 118.

As a seventh example, as shown in FIG. 4, a SIP reason header 302 may have a protocol value 304 of "FAILURE_CAUSE," a cause value 306 of "3," and a reason-text 308 of "User ends call Indication of failed resources allocation." In this example, the SIP reason header 302 does include a soft drop indicator 310 because the reason-text 308 includes "User ends call" to indicate that the UE 102 is terminating the call based on a manual user instruction, as well as a second text portion of "Indication of failed resources allocation." The second text portion of "Indication of failed resources allocation" can be used in a soft drop indicator 310 when a soft drop trigger 202 was activated due to a failure condition 212 in which a UE 102 was unable to allocate resources for a call. Accordingly, the telecommunication network can interpret this SIP reason header 302 to be indicating a soft drop, likely due to a bad user experience related to the UE's failure to allocate resources.

Although a soft drop indicator 310 can be signified by a combination of a first text portion and a second text portion as described above, in other examples the two text portions can be reversed. The two text portions, and their values, described above are included herein only as examples, and additional or different text portions can be used. In other examples, a soft drop indicator 310 can include preset codes or other values instead of text portions to indicate that a call termination should be considered a soft drop.

When a telecommunication network, for instance at an element of the IMS 108, receives a SIP BYE message or SIP CANCEL message from the UE 102 that includes a soft drop indicator 310, the telecommunication network can determine that the UE's termination of a call attempt or an active call should be considered a soft drop. The telecommunication network can use a reason for the soft drop indicated by the soft drop indicator 310 to investigate and fix problems with the telecommunication network or identify that soft drops are associated with particular UEs. Soft drop indicators 310 in SIP messages 116 from UEs 102 can accordingly provide valuable diagnostic information to telecommunication networks.

In some examples, the telecommunication network can use its own records about locations of UEs 102, network elements UEs are connected to, models of UEs 102, data about subscribers associated with UEs 102, and/or any other data during investigations of soft drops. For example, if multiple UEs 102 are configured to contact a particular P-CSCF 112, but those UEs 102 send SIP CANCEL messages with soft drop indicators 310 reading "User ends call SIP response time-out," the telecommunication network may be able to determine that there is an issue with that particular P-CSCF 112 and then attempt to fix or replace it to prevent similar soft drops in the future. Similarly, if a particular model of UE 102 is sending SIP BYE messages with soft drop indicators 310 reading "User ends call RTP/RTCP time-out" more frequently than other models of UEs 102, the telecommunication network may be able to determine that a software problem with that particular model of UE 102 is causing audio drops during active calls.

Example Architecture

Figure 5:
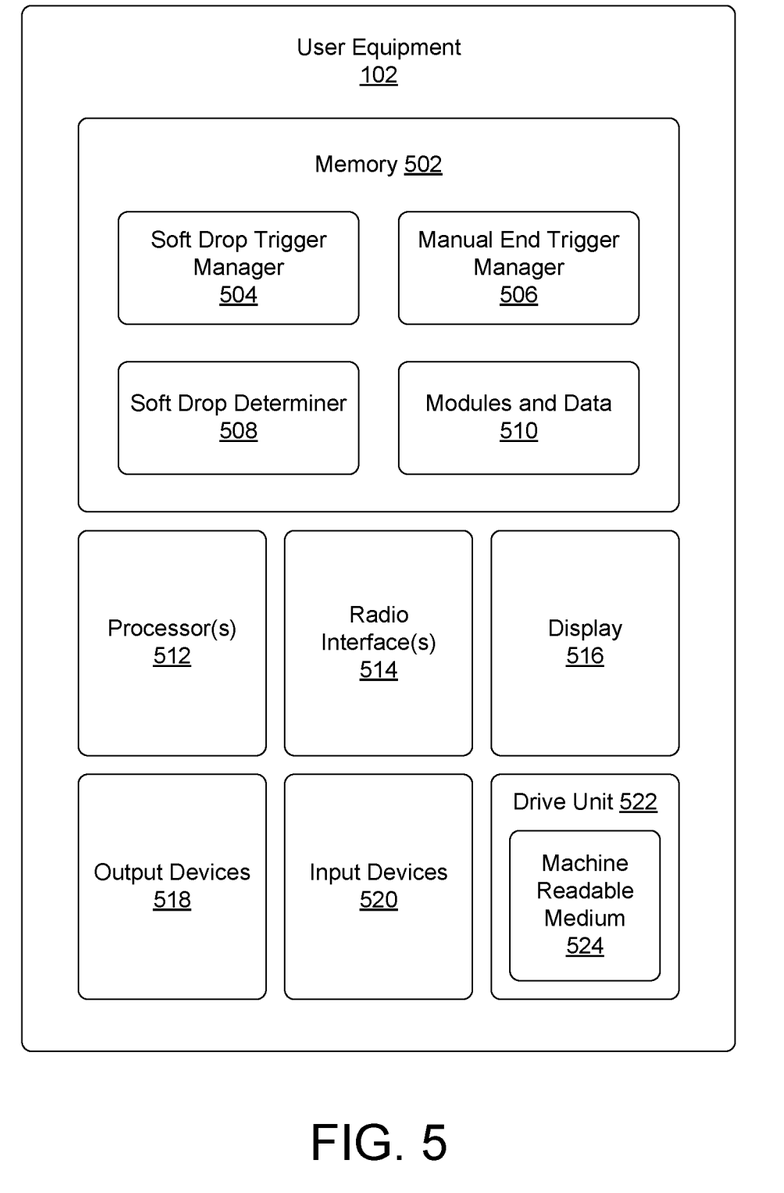
FIG. 5 depicts an example system architecture for a UE.

FIG. 5 depicts an example system architecture for a UE 102, in accordance with various examples. As shown, a UE 102 can have memory 502 storing a soft drop trigger manager 504, a manual end trigger manager 506, a soft drop determiner 508, and other modules and data 510. A UE 102 can also have processor(s) 512, radio interfaces 514, a display 516, output devices 518, input devices 520, and/or a drive unit 522 including a machine readable medium 524.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The soft drop trigger manager 504 can maintain information about whether a soft drop trigger 202 is active, and/or monitor for soft drop conditions that can activate or deactivate a soft drop trigger 202. For examples, the soft drop trigger manager 504 can set, stop, or reset timers such as an IMS connection setup timer 206, a bearer setup timer 208, or an audio inactivity timer 210 as described above, and/or activate a soft drop trigger 202 upon the expiration of such timers. In some examples, the soft drop trigger manager 504 can also deactivate a previously activated soft drop trigger 202 when it determines soft drop conditions that that activated a soft drop trigger 202 are no longer likely to be the cause of a manual call termination.

The manual end trigger manager 506 can track whether a manual end trigger 204 has been activated by monitoring for receipt of manual user input instructing the UE 102 to end a call setup or an active call. For example, the manual end trigger manager 506 can listen for user input associated with a user's press of a hardware or virtual "end" button through an input device 520 of the UE 102, and activate a manual end trigger 204 upon receipt of such user input.

The soft drop determiner 508 can determine, based on whether a soft drop trigger 202 and a manual end trigger 204 are both active, whether a call termination is a soft drop. For example, when manual end trigger manager 506 activates a manual end trigger 204 due to receipt of manual user input to end a call attempt or an active call, the soft drop determiner 508 can determine if the soft drop trigger manager 504 indicates that a soft drop trigger 202 is also active. If both a soft drop trigger 202 and a manual end trigger 204 are active, the soft drop determiner 508 can prepare, or assist in preparing, a SIP reason header 302 that includes a soft drop indicator 310 associated with the reason for the soft drop. For example, the soft drop trigger manager 504 can provide information to the soft drop determiner 508 about why the active soft drop trigger 202 was activated, and the soft drop trigger manager 504 can find a corresponding protocol value 304, cause value 306, and soft drop indicator 310 to be included in reason-text 308.

The other modules and data 510 can be utilized by the UE 102 to perform or enable performing any action taken by the UE 102. The modules and data 510 can include a UE platform, operating system, and applications, and data utilized by the platform, operating system, and applications.

In various examples, the processor(s) 512 can be a central processing unit (CPU), a graphics processing unit (GPU), or both CPU and GPU, or any other type of processing unit. Each of the one or more processor(s) 512 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 512 may also be responsible for executing all computer applications stored in the memory 502, which can be associated with common types of volatile (RAM) and/or nonvolatile (ROM) memory.

The radio interfaces 514 can include transceivers, modems, interfaces, antennas, and/or other components that perform or assist in exchanging radio frequency (RF) communications with a base station of a wireless telecommunication network, a Wi-Fi access point, or otherwise implement connections with one or more networks. The radio interfaces 514 can be compatible with 5G wireless access technologies, 4G/LTE wireless access technologies, other legacy wireless access technologies, Wi-Fi, and/or any other type of wireless connection.

The display 516 can be a liquid crystal display or any other type of display commonly used in UEs 102. For example, display 516 may be a touch-sensitive display screen, and can then also act as an input device or keypad, such as for providing a soft-key keyboard, navigation buttons, or any other type of input.

The output devices 518 can include any sort of output devices known in the art, such as a display 516, speakers, a vibrating mechanism, and/or a tactile feedback mechanism. Output devices 518 can also include ports for one or more peripheral devices, such as headphones, peripheral speakers, and/or a peripheral display.

The input devices 520 can include any sort of input devices known in the art. For example, input devices 520 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 524 can store one or more sets of instructions, such as software or firmware, that embodies any one or more of the methodologies or functions described herein. The instructions can also reside, completely or at least partially, within the memory 502, processor(s) 512, and/or radio interface(s) 514 during execution thereof by the UE 102. The memory 502 and the processor(s) 512 also can constitute machine readable media 524.

Example Operations

Figure 6:
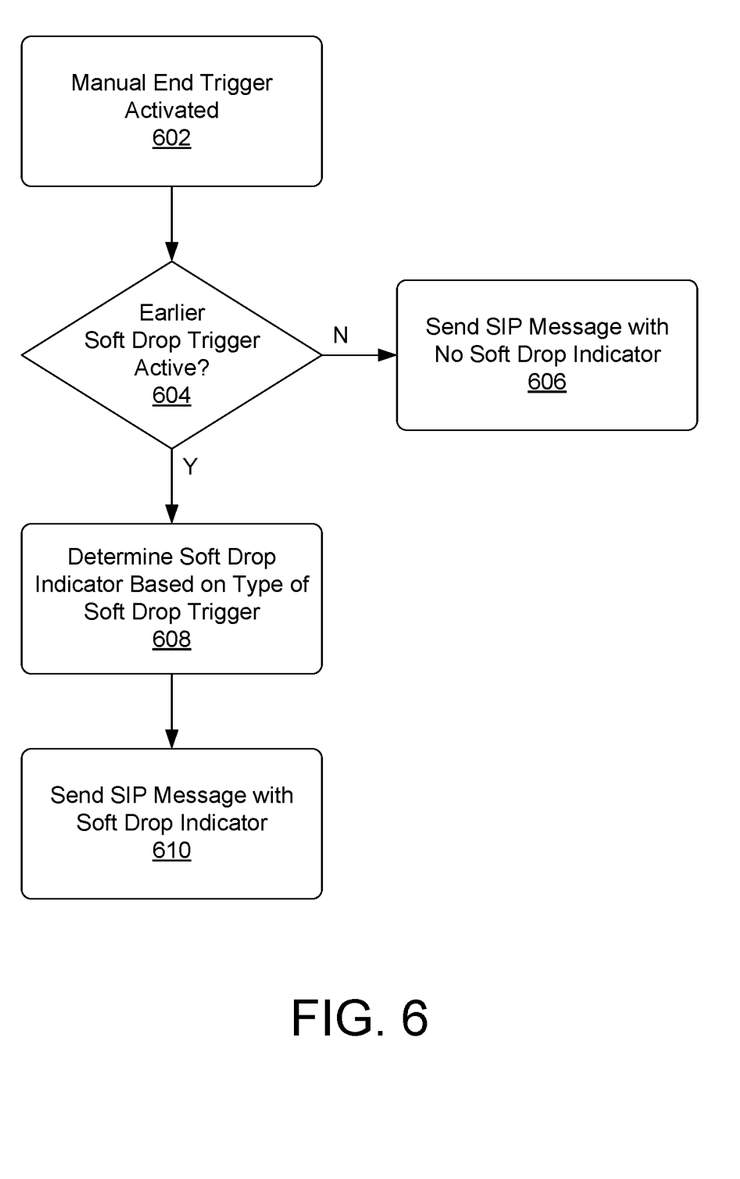
FIG. 6 depicts a flow chart of a method for a UE to determine whether to send a SIP message with a SIP reason header that contains a soft drop indicator.

FIG. 6 depicts a flow chart of a method for a UE 102 to determine whether to send a SIP message 116 with a SIP reason header 302 that contains a soft drop indicator 310.

At block 602, the UE 102 can determine that a manual end call trigger 204 has been activated during call setup or during an active call. For example, the UE 102 can determine that a user provided manual user input, such as by pressing a hardware or virtual "end" button, to cancel an attempted call during call setup or to hang up an active call. Such manual user input to end call setup or an active call can activate a manual end trigger 204 associated with a manual call termination.

At block 604, the UE 102 can determine whether or not a soft drop trigger 202 was also active at the time the manual end call trigger 204 was activated. If no soft drop trigger 202 was active when the manual end call trigger 204 was activated, then the UE 102 can determine that the manual call termination is likely not due to a bad user experience and should not be considered a soft drop. For example, a soft drop trigger 202 may never have been activated with respect to the call, or a previously activated soft drop trigger 202 may have been deactivated due to resolution of an issue such that that issue is no longer likely to be the cause of a manual call termination. When a manual end call trigger 204 is active, but no soft drop trigger 202 is active, the UE 102 can move to block 606 and send a SIP message 116 with a SIP reason header 302 that does not contain a soft drop indicator 310. For example, at block 606 the UE 102 can send a SIP CANCEL or SIP BYE message with reason-text 308 reading just "User ends call."

However, if at block 604 the UE 102 determines that a soft drop trigger 202 was active at the time the manual end call trigger 204 was activated, the UE 102 can move to block 608 and determine a soft drop indicator 310 based on soft drop conditions that led to activation of the soft drop trigger 202 was activated. For example, the UE 102 can maintain information about why the soft drop trigger 202 was activated, such as an indication that the soft drop trigger 202 was activated due to expiration of an IMS connection setup timer 206, expiration of a bearer setup timer 208, expiration of an audio inactivity timer 210, or upon the occurrence of a particular failure condition 212. The UE 102 can use that information why the soft drop trigger 202 was activated to determine a soft drop indicator 310 to be included in reason-text 308 of a SIP reason header 302. In some examples, the UE 102 can use the information about why the soft drop trigger 202 was activated to determine a protocol value 304 and/or cause value 306 to be sent in the SIP reason header 302 along with the reason-text 308. In some examples, the UE 102 can use a chart or table, such as the table shown in FIG. 4, to select from preset combinations of protocol values 304, cause values 306, and/or reason-text 308 based on reasons why a soft drop trigger 202 was activated.

At block 610, the UE 102 can send a SIP message 116 to the telecommunication network that includes a SIP reason header 302 with the soft drop indicator 310 determined during block 608. The UE 102 can send the SIP message 116 to an element of the IMS 108, such as an Application Server 114. When the manual call termination relates to a call setup, in some examples the SIP reason header 302 can be included in a SIP CANCEL message. When the manual call termination relates to an active call, in some examples the SIP reason header 302 can be included in a SIP BYE message.

Figure 7:
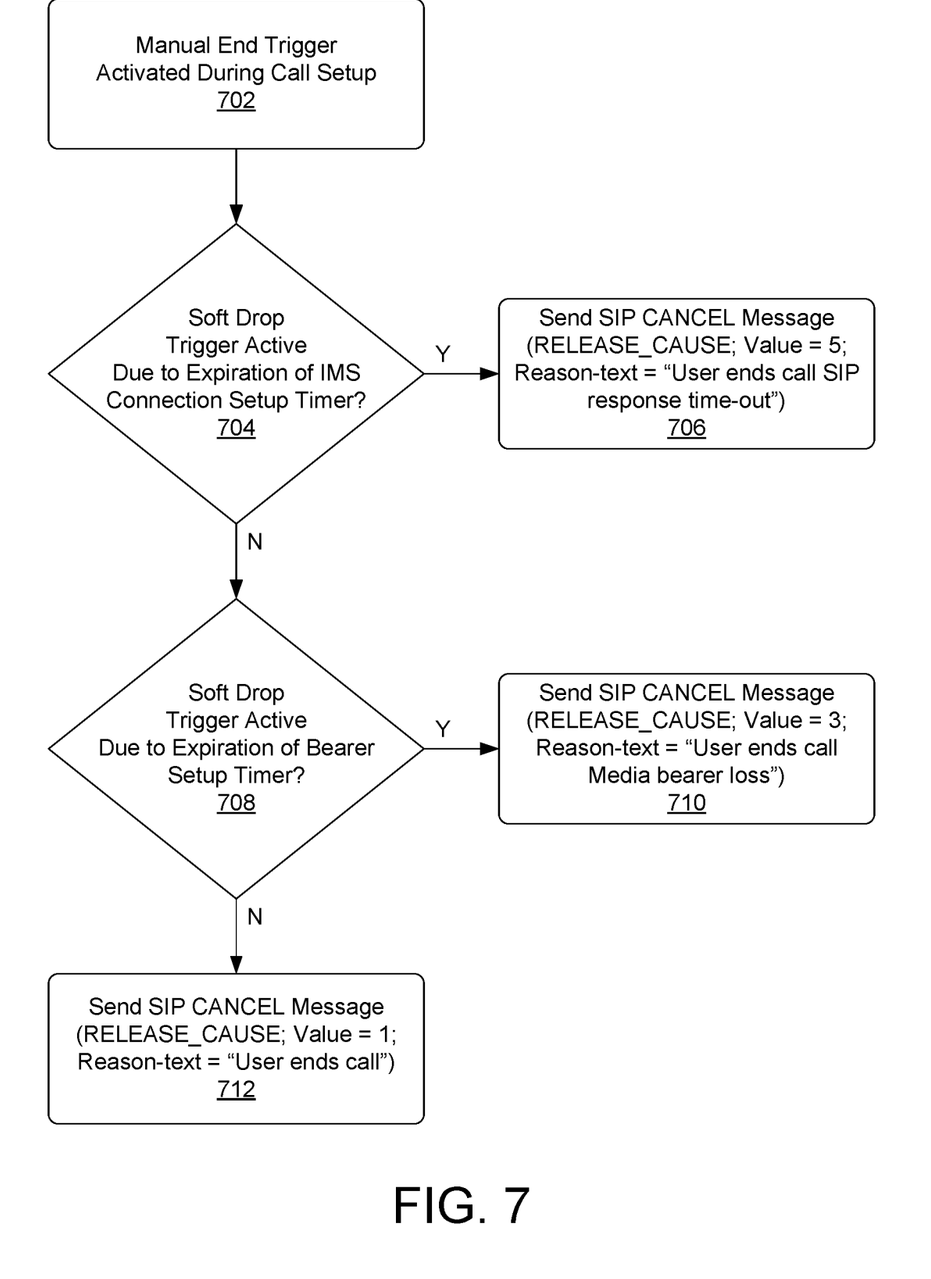
FIG. 7 depicts a flow chart of a method for a UE to determine, during a manual termination of an attempted call setup, whether to send a SIP CANCEL message with a SIP reason header that contains a soft drop indicator.

FIG. 7 depicts a flow chart of a method for a UE 102 to determine, during a manual termination of an attempted call setup, whether to send a SIP CANCEL message with a SIP reason header 302 that contains a soft drop indicator 310.

At block 702, the UE 102 can determine that a manual end call trigger 204 has been activated during call setup. For example, the UE 102 can determine that a user provided manual user input, such as by pressing a hardware or virtual "end" button, to cancel the attempted call before the call is connected and another UE 102 answers. Such manual user input to end call setup can activate a manual end trigger 204 associated with a manual call termination.

At block 704, the UE 102 can determine whether or not a soft drop trigger 202 associated with expiration of an IMS connection setup timer 206 is active. As discussed above, the UE 102 can start an IMS connection setup timer 206 when the UE 102 sends an initial SIP INVITE message to a P-CSCF 112 to initiate the call attempt. If the P-CSCF 112 does not reply before expiration of the IMS connection setup timer 206, a corresponding soft drop trigger 202 can be activated. If a soft drop trigger 202 associated with expiration of an IMS connection setup timer 206 is not active when the manual end call trigger 204 is activated, the UE 102 can move to block 708. However, if a soft drop trigger 202 associated with expiration of an IMS connection setup timer 206 is active when the manual end call trigger 204 is activated, the UE 102 can move to block 706 and send a SIP CANCEL message with a SIP reason header 302 including a protocol value 304 of "RELEASE_CAUSE," a cause value 306 of "5," and a reason-text 308 of "User ends call SIP response time-out." The reason-text 308 of "User ends call SIP response time-out" can be a soft-drop indicator 310 informing a network element that the manual call termination is a soft drop, likely due to a call setup delay caused by an unresponsive node of the IMS 108.

At block 708, the UE 102 can determine whether or not a soft drop trigger 202 associated with expiration of a bearer setup timer 208 is active. As discussed above, the UE 102 can start a bearer setup timer 208 when the UE 102 sends an initial SIP INVITE message to a P-CSCF 112 to initiate the call attempt. If the UE 102 does not receive notification from the telecommunication network that a dedicated bearer 118 is being set up for the attempted call before expiration of the bearer setup timer 208, a corresponding soft drop trigger 202 can be activated. If a soft drop trigger 202 associated with expiration of a bearer setup timer 208 is not active when the manual end call trigger 204 is activated, the UE 102 can move to block 712. However, if a soft drop trigger 202 associated with expiration of a bearer setup timer 208 is active when the manual end call trigger 204 is activated, the UE 102 can move to block 710 and send a SIP CANCEL message with a SIP reason header 302 including a protocol value 304 of "RELEASE_CAUSE," a cause value 306 of "3," and a reason-text 308 of "User ends call Media bearer loss." The reason-text 308 of "User ends call Media bearer loss" can be a soft-drop indicator 310 informing a network element that the manual call termination is a soft drop, likely due to a call setup delay related to delays in setting up a media bearer 118 for the call.

At block 712, if a soft drop trigger 202 related to expiration of an IMS connection setup timer 206 or a bearer setup timer 208 is not active when the manual end call trigger 204 was activated, the UE 102 can send a SIP CANCEL message with a SIP reason header 302 including a protocol value 304 of "RELEASE_CAUSE," a cause value 306 of "1," and a reason-text 308 of "User ends call." Because the reason-text 308 of "User ends call" does not include a second text portion that explains a reason for a soft drop, the reason-text 308 can be considered not to include a soft drop indicator 310. Accordingly, the SIP reason header 302 sent during block 712 can indicate to a telecommunication network that the manual call termination is due to a user's choice that was likely not related to a call setup delay.

Figure 8:
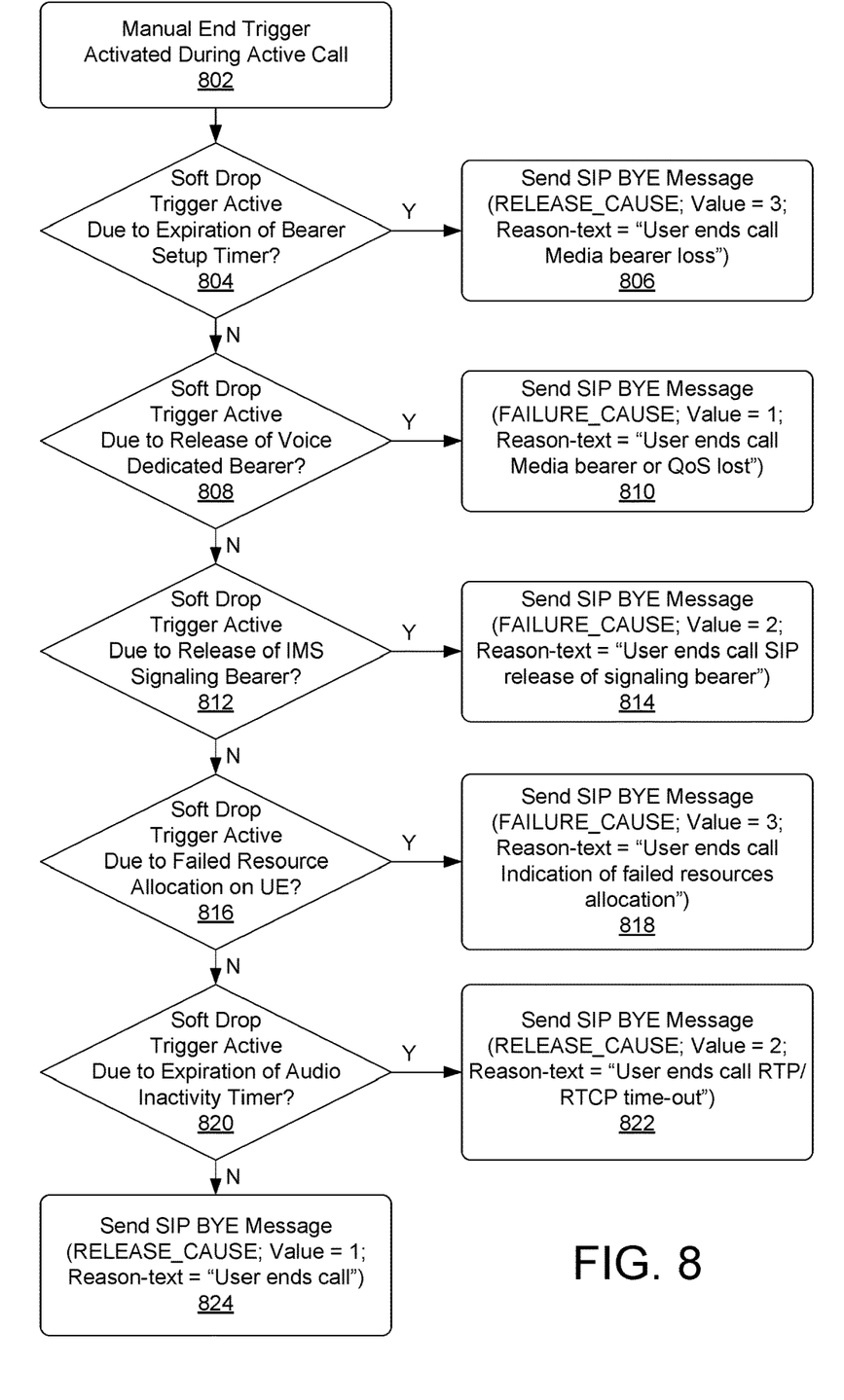
FIG. 8 depicts a flow chart of a method for a UE to determine, during a manual termination of an active call, whether to send a SIP BYE message with a SIP reason header that contains a soft drop indicator.

FIG. 8 depicts a flow chart of a method for a UE 102 to determine, during a manual termination of an active call, whether to send a SIP BYE message with a SIP reason header 302 that contains a soft drop indicator 310.

At block 802, the UE 102 can determine that a manual end call trigger 204 has been activated during an active call. For example, the UE 102 can determine that a user provided manual user input, such as by pressing a hardware or virtual "end" button, to hang up the active call. Such manual user input to end the active call can activate a manual end trigger 204 associated with a manual call termination.

At block 804, the UE 102 can determine whether or not a soft drop trigger 202 associated with expiration of a bearer setup timer 208 is active. As discussed above, the UE 102 can start a bearer setup timer 208 when the UE 102 sends an initial SIP INVITE message to a P-CSCF 112 to initiate the call attempt. If the UE 102 does not receive notification from the telecommunication network that a dedicated bearer 118 is being set up for the attempted call before expiration of the bearer setup timer 208, a corresponding soft drop trigger 202 can be activated. In some examples, the call can still be connected, but the lack of a dedicated bearer 118 for audio data can lead to the call participants being unable to hear each other. If a soft drop trigger 202 associated with expiration of a bearer setup timer 208 is not active when the manual end call trigger 204 is activated, the UE 102 can move to block 808. However, if a soft drop trigger 202 associated with expiration of a bearer setup timer 208 is active when the manual end call trigger 204 is activated, the UE 102 can move to block 806 and send a SIP BYE message with a SIP reason header 302 including a protocol value 304 of "RELEASE_CAUSE," a cause value 306 of "3," and a reason-text 308 of "User ends call Media bearer loss." The reason-text 308 of "User ends call Media bearer loss" can be a soft-drop indicator 310 informing a network element that the manual call termination is a soft drop, likely due to a bad user experience during the call related to delays in setting up a media bearer 118 for the call.

At block 808, the UE 102 can determine whether or not a soft drop trigger 202 associated with a telecommunication network's release of a voice dedicated bearer 118 is active. For example, the telecommunication network may have set up a voice dedicated bearer 118 for the call, but then experience high utilization levels or other issues such that cause it to release the voice dedicated bearer 118. The telecommunication network's release of the voice dedicated bearer 118 can activate an associated soft drop trigger 202. If a soft drop trigger 202 associated with a telecommunication network's release of a voice dedicated bearer 118 is not active when the manual end call trigger 204 is activated, the UE 102 can move to block 812. However, if a soft drop trigger 202 associated with a telecommunication network's release of a voice dedicated bearer 118 is active when the manual end call trigger 204 is activated, the UE 102 can move to block 810 and send a SIP BYE message with a SIP reason header 302 including a protocol value 304 of "FAILURE_CAUSE," a cause value 306 of "1," and a reason-text 308 of "User ends call Media bearer or QoS lost." The reason-text 308 of "User ends call Media bearer or QoS lost" can be a soft-drop indicator 310 informing a network element that the manual call termination is a soft drop, likely due to a bad user experience related to the network's release of the media bearer 118 for the call.

At block 812, the UE 102 can determine whether or not a soft drop trigger 202 associated with a telecommunication network's release of an IMS signaling bearer 118 is active. For example, the telecommunication network may have set up an IMS signaling bearer 118 for a UE 102, but then experience high utilization levels or other issues such that cause it to release the IMS signaling bearer 118. The telecommunication network's release of the IMS signaling bearer 118 can activate an associated soft drop trigger 202. If a soft drop trigger 202 associated with a telecommunication network's release of an IMS signaling bearer 118 is not active when the manual end call trigger 204 is activated, the UE 102 can move to block 816. However, if a soft drop trigger 202 associated with a telecommunication network's release of an IMS signaling bearer 118 is active when the manual end call trigger 204 is activated, the UE 102 can move to block 814 and send a SIP BYE message with a SIP reason header 302 including a protocol value 304 of "FAILURE_CAUSE," a cause value 306 of "2," and a reason-text 308 of "User ends call SIP release of signaling bearer." The reason-text 308 of "User ends call SIP release of signaling bearer" can be a soft-drop indicator 310 informing a network element that the manual call termination is a soft drop, likely due to a bad user experience related to the network's release of the IMS signaling bearer 118.

At block 816, the UE 102 can determine whether or not a soft drop trigger 202 associated with a failure by the UE 102 to allocate sufficient resources for the call is active. For example, the UE 102 may not have allocated enough memory, processing power, or network connection resources for the call, which can activate an associated soft drop trigger 202. If a soft drop trigger 202 associated with a failure by the UE 102 to allocate sufficient resources for the call is not active when the manual end call trigger 204 is activated, the UE 102 can move to block 820. However, if a soft drop trigger 202 associated with a failure by the UE 102 to allocate sufficient resources for the call is active when the manual end call trigger 204 is activated, the UE 102 can move to block 818 and send a SIP BYE message with a SIP reason header 302 including a protocol value 304 of "FAILURE_CAUSE," a cause value 306 of "3," and a reason-text 308 of "User ends call Indication of failed resources allocation." The reason-text 308 of "User ends call Indication of failed resources allocation" can be a soft-drop indicator 310 informing a network element that the manual call termination is a soft drop, likely due to a bad user experience related to the UE's failure to allocate resources.

At block 820, the UE 102 can determine whether or not a soft drop trigger 202 associated with expiration of an audio inactivity timer 210 is active. As discussed above, the UE 102 can start an audio inactivity timer 210 at the beginning of an active call, and reset the audio inactivity timer 210 whenever RTP and/or RTCP packets are found in uplink and downlink communications. However, if no RTP or RTCP packets are found in uplink or downlink communications for long enough that the audio inactivity timer 210 expires, an associated soft drop trigger 202 can be activated. If a soft drop trigger 202 associated with expiration of an audio inactivity timer 210 is not active when the manual end call trigger 204 is activated, the UE 102 can move to block 824. However, if a soft drop trigger 202 associated with expiration of an audio inactivity timer 210 is active when the manual end call trigger 204 is activated, the UE 102 can move to block 822 and send a SIP BYE message with a SIP reason header 302 including a protocol value 304 of "RELEASE_CAUSE," a cause value 306 of "2," and a reason-text 308 of "User ends call RTP/RTCP time-out." The reason-text 308 of "User ends call RTP/RTCP time-out" can be a soft-drop indicator 310 informing a network element that the manual call termination is a soft drop, likely due to an audio drop during an active call.

At block 824, if the soft drop triggers 202 described above with respect to blocks 804, 808, 812, 816, and 820 are not active when the manual end call trigger 204 was activated, the UE 102 can send a SIP BYE message with a SIP reason header 302 including a protocol value 304 of "RELEASE_CAUSE," a cause value 306 of "1," and a reason-text 308 of "User ends call." Because the reason-text 308 of "User ends call" does not include a second text portion that explains a reason for a soft drop, the reason-text 308 can be considered not to include a soft drop indicator 310. Accordingly, the SIP reason header 302 sent during block 824 can indicate to a telecommunication network that the manual call termination is due to a user's choice that was likely not related to bad user experience during the active call.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   determining, by a user equipment (UE), that a soft drop condition applies to a call over a telecommunication network, wherein the soft drop condition is indicative of bad user experience, is associated with subsequent manual call terminations;
   activating, by the UE, a soft drop trigger based on determining that the soft drop condition applies to the call;
   activating, by the UE, a manual end trigger based on receipt of manual user input terminating the call;
   determining, by the UE, that the soft drop trigger is active when the manual end trigger is activated; and
   responsive to determining that the soft drop trigger is active when the manual end trigger is activated, sending, by the UE, a message to the telecommunication network that includes a soft drop indicator associated with the soft drop condition,
   wherein the soft drop condition is the expiration of an audio inactivity timer that runs when no audio activity is detected by the UE during the call until the timer expires or audio activity is detected by the UE during the call.

2. The method of claim 1, wherein the soft drop condition is the expiration of a connection setup timer that runs until the timer expires or a node of an Internet Protocol Multimedia Subsystem (IMS) of the telecommunication network responds to a call setup message sent by the UE.

3. The method of claim 1, wherein the soft drop condition is the expiration of a bearer setup timer that runs until the timer expires or the telecommunication network, in response to a call setup message sent by the UE, informs the UE that a dedicated bearer is being set up for the call.

4. The method of claim 1, wherein the UE is configured to monitor for audio activity during the call based on at least one of Real-time Transport Protocol (RTP) or RTP Control Protocol (RTCP) packets in uplink or downlink transmissions.

5. The method of claim 1, wherein the soft drop condition is a release by the telecommunication network of a bearer associated with the call.

6. The method of claim 1, wherein the soft drop condition is a failure by the UE to allocate resources for the call.

7. The method of claim 1, wherein the call is a call setup requested by the UE.

8. The method of claim 1, wherein the call is an active call between the UE and a second UE.

9. The method of claim 1, wherein the message is a Session Initiation Protocol (SIP) message and the soft drop indicator is included in a reason-text field of a SIP reason header of the SIP message.

10. The method of claim 9, wherein the soft drop indicator includes a first text portion indicating that a user ended the call and a second text portion associated with the soft drop condition.

11. A user equipment (UE) comprising:
one or more processors; and
memory storing computer-executable instructions that, when executed by the one or more processors, cause the UE to perform operations comprising:
determining that a soft drop condition applies to a call over a telecommunication network, wherein the soft drop condition is indicative of bad user experience and is associated with subsequent manual call terminations;
activating a soft drop trigger based on determining that the soft drop condition applies to the call;
activating a manual end trigger based on receipt of manual user input terminating the call;
determining that the soft drop trigger is active when the manual end trigger is activated; and
responsive to determining that the soft drop trigger is active when the manual end trigger is activated, sending a message to the telecommunication network that includes a soft drop indicator associated with the soft drop condition,
wherein the soft drop condition is the expiration of an audio inactivity timer that runs when no audio activity is detected by the UE during the call until the timer expires or audio activity is detected by the UE during the call.

12. The UE of claim 11, wherein the soft drop condition includes an expiration of a connection setup timer that runs until the connection setup timer expires or a node of an Internet Protocol Multimedia Subsystem (IMS) of the telecommunication network responds to a call setup message sent by the UE.

13. The UE of claim 11, wherein the soft drop condition includes an expiration of a bearer setup timer that runs until the bearer setup timer expires or the telecommunication network, in response to a call setup message sent by the UE, informs the UE that a dedicated bearer is being set up for the call.

14. The UE of claim 11, wherein the message is a Session Initiation Protocol (SIP) message and the soft drop indicator is included in a reason-text field of a SIP reason header of the SIP message.

15. The UE of claim 14, wherein the soft drop indicator includes a first text portion indicating that a user ended the call and a second text portion associated with the soft drop condition.

16. One or more non-transitory computer-readable media storing computer-executable instructions that, when executed by one or more processors of a user equipment (UE), cause the one or more processors to perform operations comprising:
determining that a soft drop condition applies to a call over a telecommunication network, wherein the soft drop condition is indicative of bad user experience and is associated with subsequent manual call terminations;
activating a soft drop trigger based on determining that the soft drop condition applies to the call;
activating a manual end trigger based on receipt of manual user input terminating the call;
determining that the soft drop trigger is active when the manual end trigger is activated; and
responsive to determining that the soft drop trigger is active when the manual end trigger is activated, sending a message to the telecommunication network that includes a soft drop indicator associated with the soft drop condition,
wherein the soft drop condition is the expiration of a timer indicating a period of audio inactivity during the call.

17. The one or more non-transitory computer-readable media of claim 16, wherein the soft drop condition includes an additional timer that indicates a delay in setup of the call.

18. The one or more non-transitory computer-readable media of claim 16, wherein the message is a Session Initiation Protocol (SIP) message and the soft drop indicator is included in a reason-text field of a SIP reason header of the SIP message.

* * * * *